United States Patent [19]

Wareham

[11] 4,429,422
[45] Feb. 7, 1984

[54] FLOW CONTROL DEVICE

[76] Inventor: Oliver N. Wareham, 4 Castlereagh Crescent, Sylvania Waters, N.S.W. 2224, Australia

[21] Appl. No.: 310,299

[22] Filed: Oct. 9, 1981

[51] Int. Cl.³ .............................................. E03C 1/05
[52] U.S. Cl. ................................... 4/192; 236/12.12; 137/114
[58] Field of Search .................................. 4/191–195; 137/111, 114, 606; 236/12, 12.12, 12.15

[56] References Cited

U.S. PATENT DOCUMENTS

| 2,908,017 | 10/1950 | Whaley | 4/19 X |
| 2,987,076 | 6/1961 | Alderman | 137/606 |
| 3,337,130 | 8/1967 | Erickson | 236/12 |
| 3,638,680 | 2/1972 | Kopp | 4/192 X |
| 3,741,195 | 6/1973 | Ellis | 4/192 X |
| 3,929,281 | 12/1975 | Woodward | 137/114 X |
| 4,189,792 | 2/1980 | Veach | 4/192 X |

Primary Examiner—John W. Shepperd
Assistant Examiner—Kenneth S. Putnam
Attorney, Agent, or Firm—Hubbell, Cohen, Stiefel & Gross

[57] ABSTRACT

A liquid flow control device is disclosed for delivering either cold water or hot water mixed with cold water comprising a chamber having an inlet for cold water and an inlet for either hot water or mixed hot and cold water and a discharge outlet for connection to a sink delivery fitting, a solenoid operated valve which stops and starts the flow of cold water through the chamber, a solenoid operated valve which stops and starts the flow of hot water or mixed hot and cold water through the chamber and a switch for each solenoid the arrangement being such that some cold water flows through the device each time the latter operates.

17 Claims, 3 Drawing Figures

FLOW CONTROL DEVICE

FIELD OF THE INVENTION

This invention concerns tap arrangements for hot and cold water supplies in buildings, for example dwellings, factories, food premises and hospitals.

BACKGROUND OF THE INVENTION

When a water tap cannot be turned manually by reason of the physical infirmity or handicap of the user, or perhaps by reason of attempts to avoid transfer of bacteria such as in operating theatres, veterinary establishments and the like, special taps are often installed. One known tap has a lever for operation by the elbow instead of a cross head for operation by the fingers. Such taps are not easily operable by armless persons, persons who cannot bear skin pressure and persons with a poor sense of touch such as occurs in paralysis. In situations where showers are controlled by screw taps or a mixer tap provided with a temperature dial, often no special provision is made for the prevention of scalding which could occur in the event of an unexpected reduction in cold water pressure.

SUMMARY OF THE INVENTION

This invention provides a liquid flow control device for delivering either cold water or hot water mixed with cold water comprising a chamber having an inlet for cold water and an inlet for either hot water or mixed hot and cold water and a discharge outlet for connection to a sink delivery fitting, a solenoid operated valve which stops and starts the flow of cold water through the chamber, a solenoid operated valve which stops and starts the flow of hot water or mixed hot and cold water through the chamber and a switch for each solenoid the arrangement being such that some cold water flows through the device each time the latter operates.

The supply of water to each solenoid operated valve may be subject to a flow rate adjuster. The flow rate adjuster may be a screw tap. The cold water inlet may be connected to the hot water inlet by a breech pipe containing a one way valve which prevents the transfer of the hot water to the cold water inlet. The breech pipe may be connected between the two inlets at sites between the flow rate adjusters and the chamber. Said breech pipe may be connected between the two inlets upstream of the flow rate adjusters and may be connected between the two inlets at a site upstream of the flow rate adjuster in the cold water inlet and a site between the flow rate adjuster of the hot water inlet and the chamber. The breech pipe may also contain a further flow rate adjuster. The further flow rate adjuster may be a screw tap.

The solenoid operated valves may be associated with the chamber. The outlet may have a thermo-responsive means capable of cancelling the operation of the solenoid operated valve which controls the hot water. The electrical switches may be actuated by air pressure provided by a bellows, a proximity device, an interrupted light beam and photo-sensitive device or a contact button. A plurality of chambers and associated outlets may be each supplied by a common hot water supply and flow rate adjuster, a common cold water supply and flow rate adjuster and a breech pipe bridging the hot and cold water supplies containing a one way valve and further flow rate adjuster. valve, the ends of the breech pipe terminating in fittings for connection to screw taps and switches for the solenoid operated valves.

DESCRIPTION OF THE DRAWINGS

Various embodiments of the invention are now described with reference to the accompanying drawings in which.

DESCRIPTION OF PREFERRED EMBODIMENT

Figure 1:
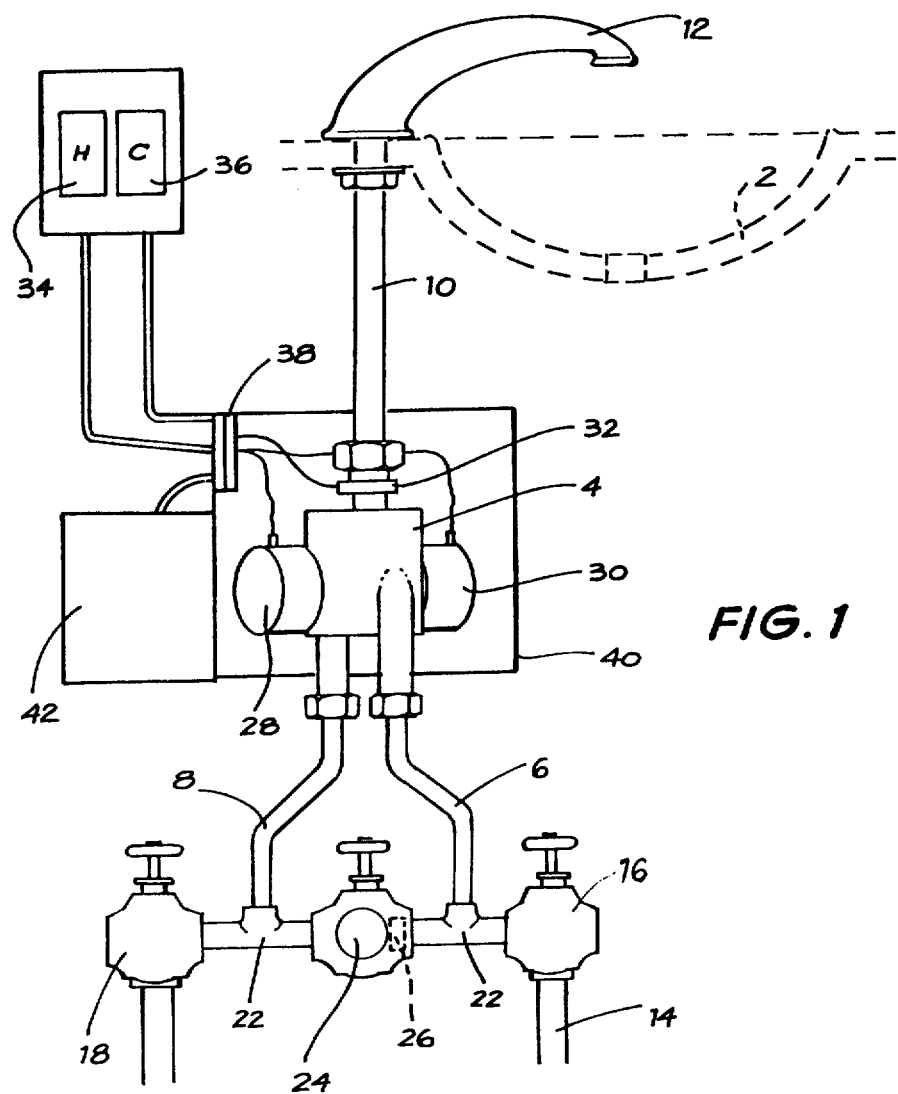
FIG. 1 is a diagram of the device arranged primarily for domestic installation.

Referring now to the drawings, the device is fitted beneath a domestic sink 2 and has a moulded plastic chamber 4 with an inlet 6 for cold water and an inlet 8 for mixed hot and cold water. The chamber has an outlet 10 which terminates in a sink discharge outlet 12. The flow of cold water from supply pipe 14 is controlled by screw tap 16. The flow of hot water from supply pipe 18 is controlled by screw tap 20. A breech pipe 22 leads from taps 14 and 18 to inlets 6 and 8 respectively. The breech pipe has a screw tap 24 which incorporates a one way valve 26.

The chamber has a pair of solenoid operated valves 28, 30 lying in moulded housings which are integral with chamber 4. A thermostat 32 is fixed to the outlet 10. Rocker switches 34, 36 are connected via a polarised jack plug 38 supported on a metal housing 40.

Figure 2:
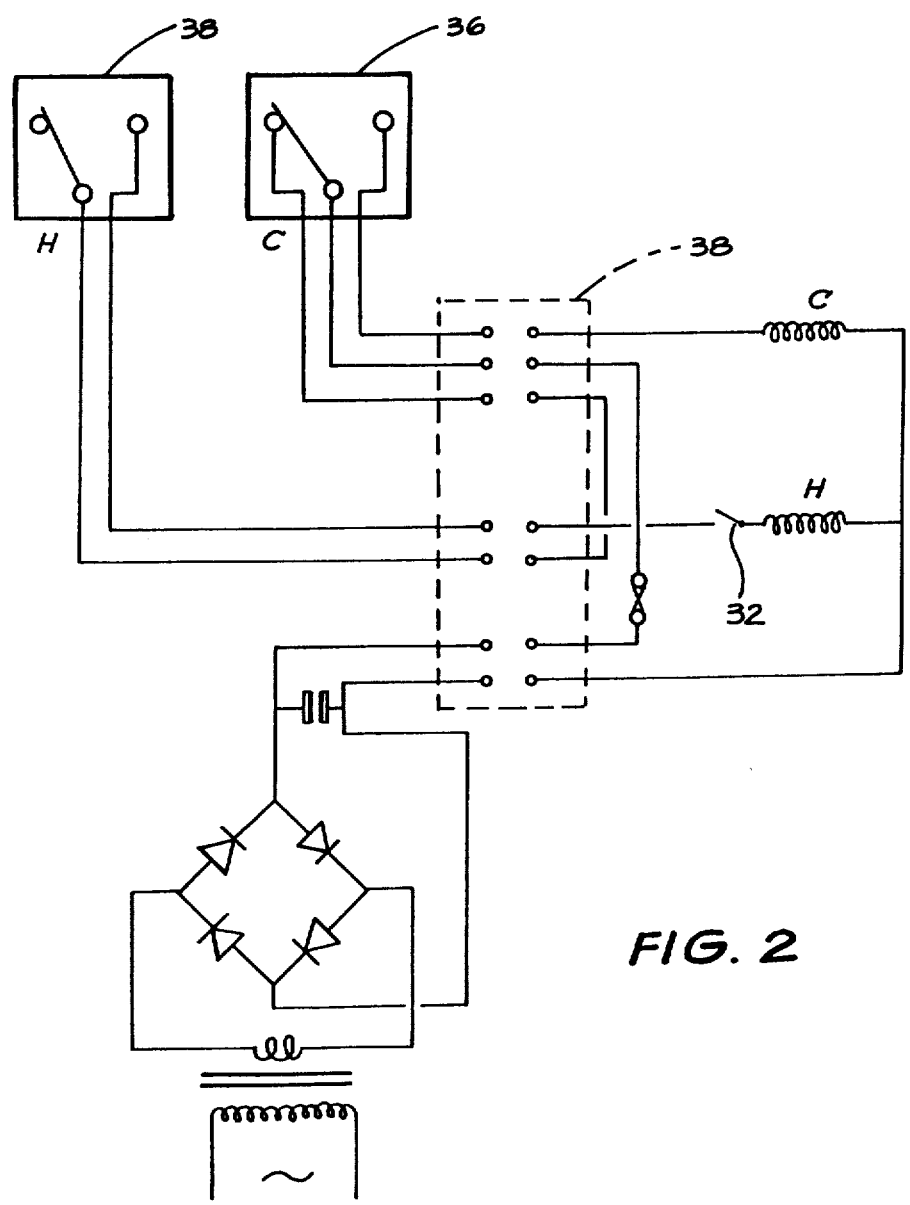
FIG. 2 is a circuit diagram of the installation in FIG. 1.

Referring now to FIG. 2, the transformer 42 supplies 12 v D.C. to solenoid C and solenoid H. The connections shown inside the broken line rectangle are the polarised pins and socket of the jack plug 38. When the switch 36 is switched to the right, current energises solenoid C but cannot energise solenoid H because of the broken circuit at switch 38. If switch 38 is switched to the right when switch 36 has returned, current passes through switch 36, switch 38 and solenoid H providing thermostat 32 is closed. The electrical switches shown by 34 and 36 may be similarly actuated by air pressure provided by a bellows 44, a proximity device 46, an interrupted light beam and photo-sensitive device 48 or a contact button 50.

Figure 3:
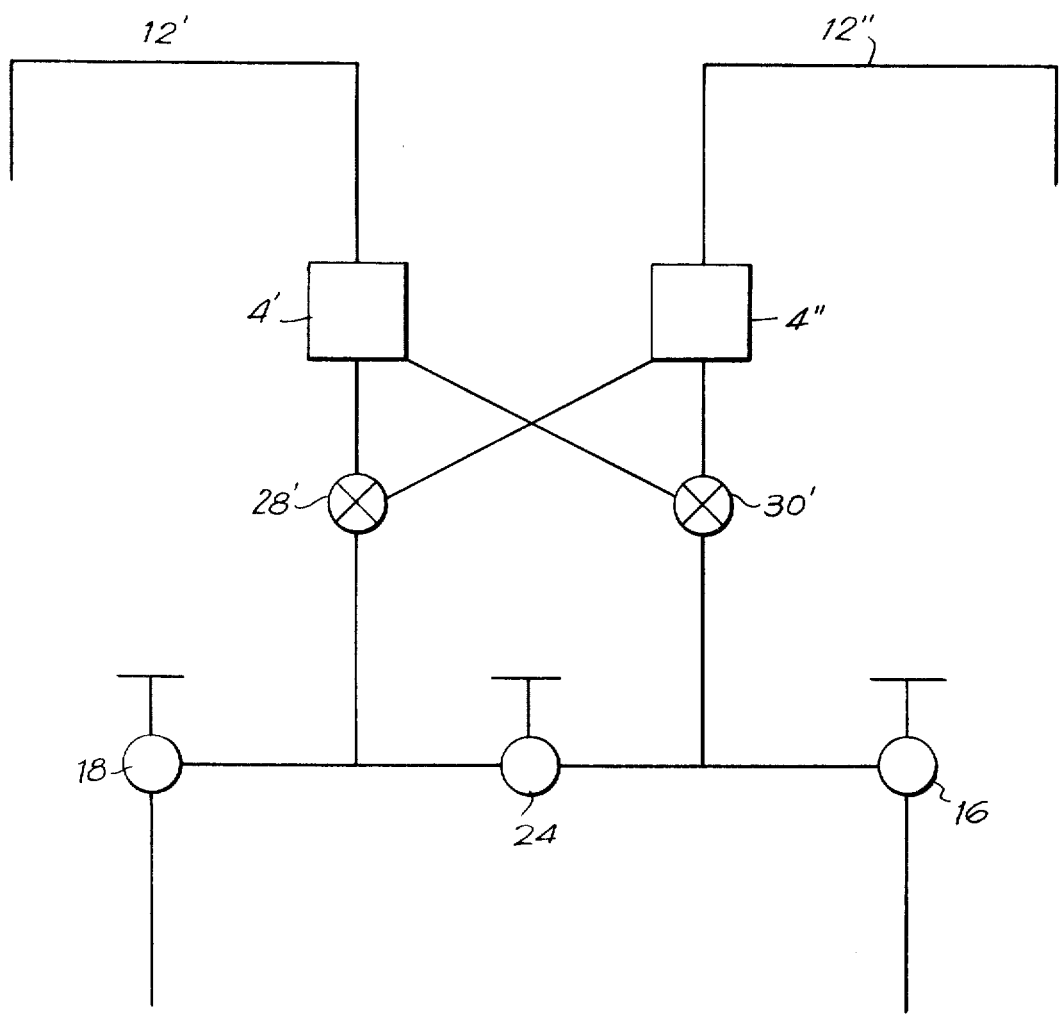
FIG. 3 is a diagram of a device similar to that shown in FIG. 1 except that it is arranged with a pair of chambers and associated outlets.

FIG. 3 shows a plurality of chambers 4' and 4" and associated outlets 12' and 12" which may be each supplied by a common hot water supply and flow rate adjuster 18, a common cold water supply and flow rate adjuster 16 and a breech pipe bridging the hot and cold water supplies containing a one way valve and further flow rate adjuster 24.

In use the device is adjusted initially by opening taps 14 and 18 to deliver water at a rate to satisfy the expected maximum. Thus the cold supply might be adjusted to a fraction of the hot supply in order that a gentle, economic rate be available for example to fill a glass without splashing. The tap 24 is then opened to reduce the temperature of the hot water from storage temperature to the selected safe temperature. The flow increases somewhat as mixed cold water is added to the flow. Thus solenoid C admits to chamber 4 only cold water. Solenoid H delivers a mixture of hot and cold water in the proportions selected by the combination of the settings of the taps which once set can be left as they are. Should there be an unplanned reduction of the cold supply when hot water is flowing through the device, thermostat 32 will open the circuit supplying solenoid H and thereafter only cold water can flow through chamber 4. If there is an electrical malfunction, the circuit will fail to allow only solenoid C to operate. The series connection renders the current of 1 amp insufficient to open both solenoids.

We have found the advantages of the invention to be as follows:

1. The device makes possible the economic and safe use of water;
2. Greater hygiene is possible due to the relegation of taps to a flow control role instead of an on/off control;
3. Greater protection against vandalism is afforded.

I claim:

1. A liquid flow control device for delivering from a hot water supply and a cold water supply either cold water or hot water mixed with cold water, said flow control device comprising a chamber having a first inlet, a second inlet and a discharge outlet for connection to a sink delivery fitting, means connecting said first inlet to said cold water supply means for connecting said second inlet to said hot water supply, means for connecting said first inlet to said second inlet by a breech pipe, a one way valve interposed in said breech pipe for preventing the transfer of hot water to said first inlet while permitting transfer of cold water to said second inlet, a solenoid operated valve which stops and starts the flow of water through said first inlet into said chamber, a solenoid operated valve which stops and starts the flow of water through said second inlet into said chamber, and switch means for controlling said solenoids so that some cold water flows through the liquid flow control device each time it operates.

2. A liquid flow control device as claimed in claim 1 wherein the supply of water to each solenoid operated valve is subject to a flow rate adjuster.

3. A liquid flow control device as claimed in claim 2 wherein the flow rate adjuster is a screw tap.

4. A liquid flow control device as claimed in claim 2 wherein the breech pipe is connected between the two inlets at sites between the flow rate adjusters and the chamber.

5. A liquid flow control device as claimed in claim 2 wherein the breech pipe is connected between the two inlets upstream of the flow rate adjusters.

6. A liquid flow control device as claimed in claim 2 wherein the breech pipe is connected between the two inlets at a site upstream of the flow rate adjuster in the cold water inlet and a site between the flow rate adjuster of the hot water inlet and the chamber.

7. A liquid flow control device as claimed in claim 2 wherein the breech pipe also contains a further flow rate adjuster.

8. A liquid flow control device as claimed in claim 7 wherein the further flow rate adjuster is a screw tap.

9. A liquid flow control device as claimed in claim 1 wherein the solenoid operated valves are associated with the chamber.

10. A liquid flow control device as claimed in claim 1 wherein the outlet has a thermo-responsive means capable of cancelling the operation of the solenoid operated valve which controls the hot water.

11. A liquid flow control device as claimed in claim 1 wherein the switches are actuated by air pressure means provided by a bellows.

12. A liquid flow control device as claimed in claim 2 wherein a plurality of chambers and associated outlets are each supplied by a common hot water supply and flow rate adjuster, a common cold water supply and flow rate adjuster and a breech pipe bridging the hot and cold water supplies containing a one way valve and further flow rate adjuster.

13. A liquid flow control device as claimed in claim 1 wherein said switch means is actuated by proximity sensing means.

14. A liquid flow control device as claimed in claim 1 wherein said switch means is actuated by an interrupted light beam and photo-sensitive device.

15. A liquid flow control device as claimed in claim 1 wherein said switch means is actuated by a contact button.

16. A kit of parts for a hot and cold water supply installation comprising:
    (a) a chamber provided with solenoid operated valves, a hot water inlet extending from the junction with an integral screw tap, a cold water inlet extending from the junction with an integral screw tap, a pipe containing a one way valve and a screw tap connecting the cold water inlet upstream of the associated screw tap with the hot water inlet at a site between the associated screw tap and the associated solenoid operated valve, a union for each inlet for connection to respective hot and cold supply pipes, a union on the pipe junction for connection to a sink supply fitting;
    (b) switches for the solenoid operated valves and
    (c) a transformer for providing current to operate the solenoid operated valves.

17. A conversion kit for a sink installation comprising a chamber provided with an inlet for cold water, an inlet for either hot water or mixed hot water and cold water, an outlet adapted for connection to a sink supply fitting two solenoid operated valves which control the flow of the cold water and the flow of the hot water or mixed hot and cold water, the two inlets being connected to opposite sides of a breech pipe assembly containing a flow control adjuster and a one way valve, the ends of the breech pipe terminating in fittings for connection to screw taps and switches for the solenoid operated valves.

* * * * *